US006706250B2

(12) United States Patent
Carrette et al.

(10) Patent No.: US 6,706,250 B2
(45) Date of Patent: Mar. 16, 2004

(54) PROCESS FOR THE PURIFICATION OF SULFUR

(75) Inventors: Pierre-Louis Carrette, Lyons (FR); Thierry Huard, Montrouge (FR); Christian Streicher, Rueil Malmaison (FR)

(73) Assignee: Institut Francais du Petrole, Rueil-Malmaison (FR)

( * ) Notice: Subject to any disclaimer, the term of this patent is extended or adjusted under 35 U.S.C. 154(b) by 41 days.

(21) Appl. No.: 10/023,762

(22) Filed: Dec. 21, 2001

(65) Prior Publication Data

US 2002/0081261 A1 Jun. 27, 2002

(30) Foreign Application Priority Data

Dec. 21, 2000 (FR) .............................. 00 16727

(51) Int. Cl.[7] .............................................. C01B 17/027
(52) U.S. Cl. ....................................................... 423/578.1
(58) Field of Search ........................................ 423/578.1

(56) References Cited

U.S. PATENT DOCUMENTS

| | | | |
|---|---|---|---|
| 3,679,371 A | * 7/1972 | Tisdel et al. ................. 23/295 |
| 4,517,170 A | 5/1985 | Klecka ................. 423/573 R |
| 4,664,902 A | 5/1987 | Fong et al. ............. 423/567 A |
| 6,277,352 B1 | 8/2001 | Lecomte et al. |

FOREIGN PATENT DOCUMENTS

| | | |
|---|---|---|
| FR | 2700713 A1 | 7/1994 |
| FR | 2784370 A1 | 4/2000 |

* cited by examiner

*Primary Examiner*—Wayne A. Langel
(74) *Attorney, Agent, or Firm*—Millen, White, Zelano & Branigan, P.C.

(57) ABSTRACT

A process for the purification of sulfur that contains impurities is described. In a contact zone (1), solid sulfur (2) is brought into contact with at least one organic solvent (16) that is selected from the group that is formed by monohydric alcohols with 8 to 40 carbon atoms, polyols that comprise 2 to 8 hydroxyl groups and that have 8 to 40 carbon atoms, polyalkylene glycols and polyalkylene glycol ethers under suitable conditions for carrying out the melting of sulfur. The supply of sulfur is halted, and the mixture that is obtained is allowed to decant so as to produce the segregation or liquid/liquid separation of the purified liquid sulfur that is obtained and organic solvent that contains impurities. At least a portion of the purified liquid sulfur is drawn off (8) from the lower portion of the contact zone. The solvent can be used until it is saturated with products that are dissolved and/or in suspension, no longer allowing the separation of the liquid sulfur and the solvent. It can be either regenerated and recycled or eliminated.

Application of the process for the purification of the sulfur that is obtained in a "redox" process.

18 Claims, 1 Drawing Sheet

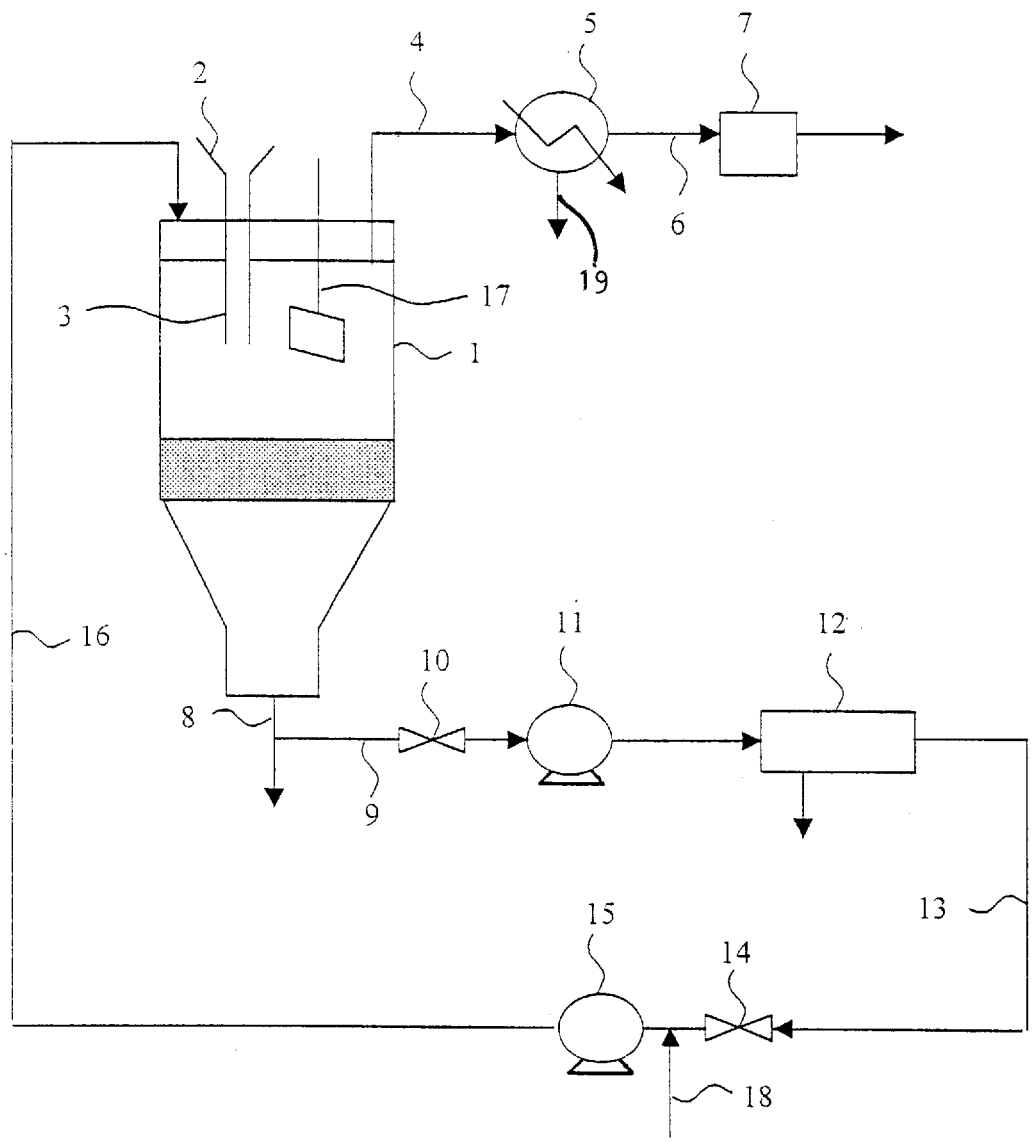

PROCESS FOR THE PURIFICATION OF SULFUR

This invention relates to a discontinuous process for the purification of sulfur by washing with an organic solvent. The sulfur that is to be purified is actually contaminated by solid or liquid, organic or inorganic chemical radicals. The process according to the invention pertains to, for example, the sulfur that is obtained in a "redox" process for desulfurization of a gas that contains at least hydrogen sulfide. This type of process can use a catalytic solution that comprises at least one multivalent metal ($Fe^{3+}$ or $V^{5+}$, for example) that may or may not be chelated by at least one chelating agent under suitable conditions for carrying out the oxidation of the hydrogen sulfide into elementary sulfur and the simultaneous reduction of the multivalent metal that may or may not be chelated from a higher degree of oxidation to a lower degree of oxidation. The gaseous effluent that is recovered is almost free of hydrogen sulfide. The catalytic solution is at least partially reduced and contains elementary sulfur. Sulfur can be removed from the catalytic solution before or after the regeneration stage of the catalytic solution. The sulfur that is collected at least in part is then purified according to the process of the invention.

Patents FR-A-2 700 713 and U.S. Pat. No. 4,664,902 illustrate the technological background.

The prior art describes numerous "redox" processes and related devices that make it possible to eliminate the hydrogen sulfide and to recover the elementary sulfur that is formed during the process.

By way of example, a desulfurization process that uses an iron chelate comprises, for example, the two oxidation-reduction stages below:

In a first stage (absorption of gas and oxidation-reduction reaction), the hydrogen sulfide that is present in the gas that is to be treated reacts with, for example, chelated ferric ions according to the invention:

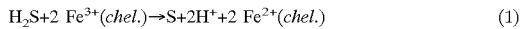

$$H_2S + 2\ Fe^{3+}(chel.) \rightarrow S + 2H^+ + 2\ Fe^{2+}(chel.) \quad (1)$$

in a second stage (regeneration), the ferrous ions are reoxidized by the oxygen of the air following the reaction:

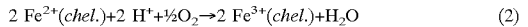

$$2\ Fe^{2+}(chel.) + 2\ H^+ + \tfrac{1}{2}O_2 \rightarrow 2\ Fe^{3+}(chel.) + H_2O \quad (2)$$

The catalytic solution may or may not be an aqueous solution of chelated iron, produced from ferrous or ferric iron salts such as sulfates, nitrates, thiosulfates, chlorides, acetates, oxalates and/or phosphates. The ferrous and ferric ions can be replaced respectively by vanadate ions IV and V. The catalytic solution can also contain sodium, potassium, and ammonium ions, carbonates, and/or anthraquinone disulfonates.

The chelating agents, used individually or in a mixture, can be organic compounds that are known for their complexing properties, for example acetylacetone, citric acid, salicylic acid, sulfosalicylic acid, tiron (catechodisulfonic acid), dimercapto-2,3-propanol and amino acids, such as, for example, EDTA (ethylenediamine tetraacetic acid), HEDTA (hydroxy-2-ethylenediamine triacetic acid), NTA (nitrilotriacetic acid), DCTA (diamino-1,2-cyclohexane tetraacetic acid), DPTA (diethylenetriamine pentaacetic acid), IDA (iminodiacetic acid) and ADA (N-(2-acetamido) iminodiacetic) acid).

The solid sulfur that is formed in the "redox" processes is in close contact with the catalytic solution. Most often, the sulfur recovery techniques that are used are mechanical: filtration, flotation or centrifuging. The amount of catalytic solution that is entrained physically with the sulfur is therefore significant. Consequently, the sulfur that is produced is of poor quality.

In contrast, during second stage (2), secondary reactions can arise, in particular the degradation of the chelating agent, which cause the formation of products that accumulate in the catalytic solution and that can precipitate. These products, organic or inorganic compounds, are also entrained with the sulfur and contribute to its poor quality.

Thus the sulfur, obtained in particular from "redox" processes, is not of adequate quality, in particular in the hypothesis of an application in the chemistry sector.

The prior art describes processes and devices that make it possible to purify the elementary sulfur that is formed in "redox" processes.

U.S. Pat. No. 5,122,351 describes a method where the sulfur is washed by suspending it in water, then it is melted to be separated from the aqueous solution. The washing solution is concentrated by evaporation and reinjected in the "redox" process in the $H_2S$ absorption stage. The evaporated water is recycled for washing the sulfur. The investment costs of such a process are significant. Among other things, a pressurized separator and an evaporator are required. In addition, this process imposes the use of costly materials for limiting the corrosion problems that are linked to the presence of water that are increased at high temperature. Furthermore, the water-insoluble products will not be eliminated.

U.S. Pat. No. 4,705,676 describes a method for purifying sulfur by melting sulfur in a phase separator under an inert atmosphere. The supernatant aqueous catalytic solution is reinjected in the absorber or in the regenerator. The liquid sulfur is filtered. This process requires a pressurized separator that can resist corrosion. In addition, the filtration of the liquid sulfur can be considered only with a large-pore filter to limit the clogging problems. Fine particles thus will remain mixed with the sulfur.

U.S. Pat. No. 4,517,170 describes a method for extraction of sulfur from the catalytic solution of a "redox" process by suspending solid sulfur in a mixture of aliphatic hydrocarbons that have 4 to 8 carbon atoms and recovery of the aqueous catalytic solution. The sulfur and the hydrocarbons can then be separated following different methods. If the solid sulfur is separated mechanically (filtration, centrifuging, . . . ), it will contain a significant amount of hydrocarbons that limits its purity.

According to a variant of this method, the sulfur suspension in the hydrocarbons can be heated in a separator to a sufficient temperature to allow the melting of the sulfur. The use of a pressurized separator to keep the hydrocarbons in liquid phase and to obtain a phase separation produces high costs. In addition, the sulfur that is thus obtained has a purity that is reduced by the solubility of the hydrocarbons in the liquid sulfur.

Finally, if the separator is at a pressure that is close to atmospheric pressure, the hydrocarbons are vaporized. This vaporization leads to residues that pollute the sulfur. This process therefore leads to sulfur of a reduced purity.

The object of the invention is to propose a new method for washing sulfur that offers in particular the advantage of resulting in a sulfur of very high purity. Actually, according to the invention, the sulfur is washed in the liquid state, which makes it possible to eliminate any product that would remain adsorbed on the sulfur in the solid state. In addition, the invention uses an organic solvent that is almost insoluble in the liquid sulfur and that makes it possible to eliminate any compound that is soluble or insoluble in the solutions that are now used in the "redox" processes. The finest particles are also eliminated by extraction in the washing solvent. The process that is described in the invention furthermore has lower investment costs than the above-mentioned processes of the prior art. Actually, the chamber for bringing the sulfur into contact with the solvent is used at a pressure that is close to atmospheric pressure. In addition, it may be made of carbon steel because washing the sulfur does not require any addition of water, and water, optionally present in the sulfur, is vaporized under suitable operating conditions.

Finally, the purification of the sulfur as it is carried out by this invention makes it possible, on the one hand, to upgrade it, and, on the other hand, to reduce the volumes for disposal in the case where the unpurified sulfur would be considered as waste.

This invention relates to a process for the purification of sulfur that is obtained from, for example, a "redox" process and that contains impurities.

It is characterized in that it comprises the series of the following stages:

In a contact zone, solid sulfur is brought into contact with at least one organic solvent that is selected from the group that is formed by monohydric alcohols with 8 to 40 carbon atoms, whereby the polyols comprise 2 to 8 hydroxyl groups and have 8 to 40 carbon atoms, polyalkylene glycols and polyalkylene glycol ethers under suitable conditions for carrying out the melting of sulfur.

The supply of sulfur is halted, and the mixture that is obtained is allowed to decant so as to carry out the segregation or the liquid/liquid separation of the purified liquid sulfur that is obtained and the organic solvent that contains impurities.

At least a portion of the purified liquid sulfur is drawn off from the lower portion of the contact zone.

The solid sulfur that is to be treated is generally brought into contact with the organic solvent under suitable heating conditions to carry out the melting of sulfur.

The products that are contained in the sulfur are separated after decanting. They can be, for example, vaporized or dissolved in the solvent or can also be concentrated at the interface between the liquid sulfur and the solvent, preferably in the solvent.

The liquid sulfur that is thus washed is recovered. It is pure enough to make it upgradable.

The organic solvent can be used until it is saturated with products that are dissolved and/or in suspension, no longer allowing the separation of the liquid sulfur and the solvent.

The organic phase can then be incinerated or disposed of at least in part.

According to a variant of the invention, the solvent may be at least partly regenerated. More specifically, it is possible to draw off at least a portion of the organic solvent that results from the decanting stage that contains impurities; said organic solvent is purified so as to remove from it at least a portion of the impurities; at least a portion of the purified organic solvent is collected, and it is recycled in the contact zone. According to an implementation of the process, the solid products are separated from the solvent according to a treatment method or methods such as those described in Patent FR 2784370.

The washing solvent is at least one organic solvent that can be selected from the group that is formed by:
  the heavy alcohols that have 8 to 40 carbon atoms,
  the polyols that comprise 2 to 4 hydroxyl groups and that have 8 to 40 carbon atoms,
  the polyalkylene glycols,
  the ethers of these polyalkylene glycols.

These heavy alcohols and polyols can be linear or branched. The heavy alcohols can be primary, secondary or tertiary, preferably primary for cost reasons.

Organic solvents that can be used according to the invention are cited by way of examples:

1-Octanol, 1-dodecanol, 1-hexadecanol, 9-heptadecanol, 1-cicosanol, 1,4-heptadecanediol, 1,4,8-pentadecanetriol, pentaethylene glycol, hexaethylene glycol, octaethylene glycol, diethylene glycol, triethylene glycol, polyethylene glycol 400 (with a mean molar mass by weight of 400 g/mol), tripropylene glycol, propylene glycol, polypropylene glycol 600 (with a mean molar mass by weight of 600 g/mol), octaethylene glycol ethyl monoether, terapropylene glycol butyl monoether, polyethylene glycol 400 methyl monoether, tetrapropylene glycol ethyl monoether. It is preferably possible to use a polyethylene glycol due to its insolubility in the liquid sulfur, its low vapor pressure and its good thermal stability.

BRIEF DESCRIPTION OF THE DRAWING

Other advantages and characteristics according to the invention will be better understood from reading the description below of the embodiment that is described by way of nonlimiting example by referring to FIG. 1 that shows a diagram of an arrangement of the necessary equipment for the implementation of the process according to the invention in the case of the regeneration and recycling of solvent.

The device for implementing the process by batch according to the invention, which is described in FIG. 1, comprises a chamber for bringing into contact (1) the sulfur to be treated with the solvent, where the melting of sulfur, its washing preferably while being stirred mechanically and the segregation or liquid/liquid separation of the liquid sulfur and the solvent are carried out. The sulfur that is to be treated may contain 2 to 90% by weight of a "redox" catalytic solution. Subjecting sulfur to a prior separation stage (filtration, centrifuging, . . . ) advantageously makes it possible to recover a portion of the catalytic solution. The sulfur that is to be treated preferably contains 5 to 50% by weight of catalytic solution.

The temperature of the chamber for contact with the washing solvent is usually between 120 and 160° C., preferably between 125 and 150° C., thanks to conventional heating means. The sulfur is generally mixed with the solvent while being stirred in suitable proportions: 5 to 80% by weight of sulfur to be treated and preferably 40 to 60% by weight.

The sulfur-solvent mixture is preferably carried out while being stirred. After the introduction of the sulfur is stopped, the stirring can be stopped or maintained preferably from 5 to 60 minutes. The water and/or organic products that are optionally contained in the sulfur vaporize.

The stirring is then halted, and after decanting, three zones can be distinguished in the chamber. The decanting lasts from 1 to 60 minutes and preferably 2 to 15 minutes.

The first zone, upper, is the organic phase: the washing solvent that can contain impurities in the form of products that are dissolved and/or in suspension. The cover located above the organic phase can be an inert gas.

The second zone is the interface between the liquid sulfur and the solvent, a zone that contains the most solid products as impurities.

DETAILED DESCRIPTION OF THE DRAWING

Finally, the third zone is the bottom of the chamber that contains only liquid sulfur.

Contact chamber (1) is equipped with a mechanical stirrer (17), a pipe for feeding (2) solid sulfur that is to be purified (for example a heated hopper that is equipped with a pipe (3) that allows the introduction of sulfur), a pipe for evacuating vaporized compounds (4), a pipe for drawing off (9) solvent that is to be recycled and a pipe for feeding (16) solvent, recycled after the elimination of impurities, in the upper portion of the chamber.

At the outlet of chamber (1), the vaporized products are fed via pipe (4) to, for example, a heat exchanger (5), where the water and/or organic products that are optionally contained in the sulfur are condensed. Water and/or organic impurities are removed from exchanger (5 via line (19). The residual gaseous effluent can be sent via pipe (6) to an activated carbon (7) before disposal.

The solvent can be recycled. When the quality of the sulfur is no longer satisfactory, all of the solvent or the solvent that contains the majority of the impurities can be taken up by a pipe (9) in the lower portion of chamber (1) through a valve (10) via a pump (11) and can be sent into a system for purification of solvent (12). It can involve, for example, a system for filtration of solid products or a system for washing with water in proportions that allow the solubilization of solid products and the separation of the aqueous phase and the organic phase. At the outlet, the purified solvent is recycled via a pipe (13) through a valve (14) via a pump (15) to chamber (1) for treatment of sulfur. An addition of solvent via a line (18) can be carried out upstream from pump (15). Elements (9) to (16) are preferably heated to a suitable temperature to prevent the crystallization of sulfur. The solvent can be used until the phase separation is no longer defined.

The example that is given below has as its objective to make the process according to the invention and the advantages that it offers more readily understandable.

EXAMPLE

The sulfur that is to be treated contains:

12% (by mass) of water, 3.15% (by mass) of an equimolar mixture of the sodium salts of nitrilotriacetic and iminodiacetic acids, 0.4% (by mass) of iron.

In a 2 liter double jacket reactor, 600 g of polyethylene glycol of molar mass 400 g/mol (PEG 400) is heated to 125° C. while being stirred mechanically. 400 g of sulfur to be treated is introduced there. The sulfur melts, and the water evaporates. The stirring is maintained for 15 minutes. The stopping of the stirring makes possible the decanting of the liquid sulfur. The salts appear in the interface between the lower phase, the liquid sulfur and the upper phase, PEG 400. After 2 minutes of decanting, the liquid sulfur is drawn off, and 600 g of PEG 400 is left in the reactor. 400 g of the sulfur to be treated is then introduced while being stirred mechanically and the process steps that are described above are followed again. The addition of sulfur is halted when the separation of phases is slow and imperfect. The sampled sulfur that is clear yellow in color contains less than 0.1% by weight of carbon, and its ash content is less than 0.1% by weight. Thus, 6400 g of impure sulfur could be treated before it is necessary to regenerate the solvent that contains the impurities that are solid, dissolved and/or in suspension.

The example is repeated by using as organic solvent 1-octanol instead of PEG 400, and approximately the same results were obtained.

What is claimed is:

1. A process for the purification of sulfur that contains impurities, comprising contacting, in a contacting zone, solid sulfur with at least one organic solvent selected from the group consisting of monohydric alcohols with 8 to 40 carbon atoms, polyols with 2 to 8 hydroxyl groups and 8 to 40 carbon atoms, polyalkylene glycols and polyalkylene glycol ethers, under suitable conditions for carrying out the melting of sulfur; halting the supply of sulfur, and decanting a mixture that is obtained after segregation or liquid/liquid separation of purified liquid sulfur from organic solvent that contains impurities.

2. A process according to claim 1, wherein at least a portion of the organic solvent that results from decanting and contains impurities is drawn off, said organic solvent is purified so as to remove from it at least a portion of the impurities; at least a portion of the purified organic solvent is collected, and it is recycled in the contact zone.

3. A process according to claim 1, wherein at least a portion of the organic solvent that results from the decanting stage is purged from the process.

4. A process according to claim 1, wherein the solid sulfur is mixed with a redox catalytic solution and wherein prior to the stage of bringing said solid sulfur into contact with the organic solvent, separating at least a portion of the "redox" catalytic solution from the sulfur to be purified.

5. A process according to claim 4, wherein the sulfur to be purified contains 2 to 90% by weight of the redox catalytic solution.

6. A process according to claim 1, wherein the contact zone is at a temperature of 120 to 160° C.

7. A process according to claim 1, wherein the sulfur to be purified is brought into contact with the solvent in proportions of between 5 and 80% by weight of sulfur.

8. A process according to claim 1, wherein a vapor phase that is condensed so as to recover a liquid phase that contains impurities and a residual gaseous effluent that is purified before disposing of it are drawn off.

9. A process according to claim 1, wherein the organic solvent is a polyethylene glycol.

10. A process according to claim 5, wherein the sulfur to be purified contains 5 to 50% by weight of the redox solution.

11. A process according to claim 2, wherein the organic solvent is a polyethylene glycol.

12. A process according to claim 3, wherein the organic solvent is a polyethylene glycol.

13. A process according to claim 4, wherein the organic solvent is a polyethylene glycol.

14. A process according to claim 5, wherein the organic solvent is a polyethylene glycol.

15. A process according to claim 6, wherein the organic solvent is a polyethylene glycol.

16. A process according to claim 7, wherein the organic solvent is a polyethylene glycol.

17. A process according to claim 10, wherein the organic solvent is a polyethylene glycol.

18. A process according to claim 1, further comprising drawing off at least a portion of purified liquid sulfur from a lower portion of the contact zone.

* * * * *